(12) United States Patent
Singhania

(10) Patent No.: US 11,706,183 B2
(45) Date of Patent: *Jul. 18, 2023

(54) SYSTEM AND METHOD OF RECEIVING, MANAGING, CONTROLLING, SAVING AND SHARING INFORMATION CONTENT OF SOCIAL MEDIA PLATFORMS AND OTHER APPLICATIONS

(71) Applicant: Harsh Vardhan Singhania, Arlington, VA (US)

(72) Inventor: Harsh Vardhan Singhania, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,124

(22) Filed: Sep. 11, 2022

(65) Prior Publication Data
US 2023/0006964 A1    Jan. 5, 2023

Related U.S. Application Data

(63) Continuation of application No. 16/961,677, filed on Jul. 11, 2020, now Pat. No. 11,477,155.

(51) Int. Cl.
*H04L 51/52* (2022.01)
*H04L 51/046* (2022.01)
*H04L 51/063* (2022.01)
*H04L 51/10* (2022.01)
*G06F 16/951* (2019.01)
*G06Q 50/00* (2012.01)

(52) U.S. Cl.
CPC ............ *H04L 51/52* (2022.05); *G06F 16/951* (2019.01); *G06Q 50/01* (2013.01); *H04L 51/046* (2013.01); *H04L 51/063* (2013.01); *H04L 51/10* (2013.01)

(58) Field of Classification Search
CPC ........ G06F 16/951; G06F 50/01; G06F 50/10; H04L 51/52; H04L 51/10; H04L 51/046; H04L 51/063
See application file for complete search history.

(56) References Cited

U.S. PATENT DOCUMENTS

| | | | |
|---|---|---|---|
| 11,463,444 B2* | 10/2022 | Stephens | H04L 63/105 |
| 2008/0263103 A1* | 10/2008 | McGregor | G06F 16/447 |
| 2009/0313658 A1* | 12/2009 | Nishimura | H04N 21/43637 |
| | | | 725/59 |
| 2011/0047484 A1* | 2/2011 | Mount | G06Q 10/10 |
| | | | 715/753 |
| 2013/0132469 A1* | 5/2013 | Levicki | H04L 65/612 |
| | | | 709/203 |
| 2014/0108792 A1* | 4/2014 | Borzycki | H04L 67/567 |
| | | | 713/165 |

(Continued)

*Primary Examiner* — Sargon N Nano
(74) *Attorney, Agent, or Firm* — Craft Chu PLLC; Andrew W. Chu (57) ABSTRACT

A system and method for aggregating content, social sharing and instant messaging of saved electronic content to a memory location includes an administrator for controlling and allocating storage quota, based on a subscription type of one or more users. The user receives the electronic content on his computing device by selecting a text from the electronic content or the user can select the document by pressing the copy menu, which causes a pop-up user interface. The user can save the electronic content in one click directly on the user device or to a server as well as collaborate on the instant messaging platform to chat or share electronic content with other users.

17 Claims, 7 Drawing Sheets

(56) References Cited

U.S. PATENT DOCUMENTS

| | | | |
|---|---|---|---|
| 2015/0032686 A1* | 1/2015 | Kuchoor | H04L 51/04 |
| | | | 707/608 |
| 2015/0033149 A1* | 1/2015 | Kuchoor | H04N 21/4782 |
| | | | 715/753 |
| 2015/0134751 A1* | 5/2015 | Meyers, Jr. | H04L 51/08 |
| | | | 709/206 |
| 2015/0254782 A1* | 9/2015 | Riggs-Miller | G06Q 40/06 |
| | | | 705/30 |
| 2015/0271296 A1* | 9/2015 | Borzycki | G06F 21/41 |
| | | | 709/202 |
| 2016/0011845 A1* | 1/2016 | Kuchoor | G06F 40/169 |
| | | | 715/753 |
| 2019/0007415 A1* | 1/2019 | Kliger | H04L 63/104 |

\* cited by examiner

SYSTEM AND METHOD OF RECEIVING, MANAGING, CONTROLLING, SAVING AND SHARING INFORMATION CONTENT OF SOCIAL MEDIA PLATFORMS AND OTHER APPLICATIONS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The embodiments herein relate to a collaborative application and a computing device using the application and, more particularly, to a content aggregation, social sharing and instant messaging application all incorporated in a single platform in the application.

2. Description of Related Art Including Information Disclosed Under 37 CFR 1.97 and 37 CFR 1.98

In today's world part of computing devices, e.g. smartphone or tablet computer provides the functions of the electronic reading or editing features apart from communication with other people. These mobile computing devices are easily portable and have large storage facility for providing a great benefit to the user. When a user employs the above-mentioned computing device to read a variety of electronic books or text information, there is a need to extract some important or interested text paragraph from the text information and to store the uniformly extracted text paragraph in a predetermined document.

In some examples, a screen size of a display of the computing device may be limited and more than one application may not be displayed at the same time. In such examples, pasting data selected from a source application into a destination application may include exiting or minimizing the source application to launch or maximize the destination application. However, minimizing or exiting the source application may not be convenient if the user seeks to continue using the source application. Even if more than one application may be displayed at the same time on the computing device, switching between a source application and a destination application to perform the paste function may cumbersome and time consuming.

Based on the aforementioned operation procedures, the user needs to change different interfaces of the application programs, which is a complicated implement procedure. Further, when the user selects different text paragraphs, the user does not stop switching operation interfaces, which downgrades the user experiences.

Users have been using multiple mobile apps with various features to achieve one common objective of content (information) management. No single product gives all the features required to be a complete solution for information management from start to end, to be able to save, search, share, manage and control access to content across multiple electronic devices, that is available online and offline and can be used anytime, on any machine.

Therefore, a need remains to provide an application which can run on a computing device and provide a single platform for the user to save content which the user is reading with one click, share the saved content with other users and collaborate with other users for conversing through an instant messaging application built in the platform so that the user need not leave the screen on the computing device to perform the above tasks.

BRIEF SUMMARY OF THE INVENTION

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

The embodiments relates generally to an application and computing device for aggregation of content, social sharing and instant messaging in a single platform.

Accordingly, the embodiments provide a method of aggregating content using an application in a computing device by receiving an electronic content into the application and saving the received electronic content to a memory location, wherein an administrator of the application controls and allocates storage quota, based on a subscription type of one or more users.

Accordingly, the embodiments provide a method of aggregating content and social sharing using an application in a computing device by receiving an electronic content into the application, saving the received electronic content to a memory location, wherein an administrator of the application controls and allocates storage quota, based on a subscription type of one or more users and sharing the saved electronic content to one or more recipients using the application.

Accordingly, the embodiments provide a method of aggregating content and collaborating through an instant messaging using an application in a computing device by receiving an electronic content into the application, saving the received electronic content, wherein an administrator of the application controls and allocates storage quota, based on a subscription type of one or more users and collaborating the saved electronic content to one or more recipients using an instant messaging platform in the application based on the subscription type of the one or more users.

Accordingly, the embodiments provide a computing device for aggregating content using an application through a receiving module configured to receive an electronic content into the application, and a saving module configured to save the received electronic content to a memory location, wherein an administrator of the application controls and allocates storage quota, based on a subscription type of one or more users Accordingly, the embodiments provide a computing device for aggregating content and social sharing using an application through a receiving module configured to receive an electronic content into the application, a saving module configured to save the received electronic content to a memory location, wherein an administrator of the application controls and allocates storage quota, based on a subscription type of one or more users, and a sharing module configured to share the saved electronic content to one or more recipients using the application.

Accordingly, the embodiments provide a computing device for aggregating content and collaborating through an instant messaging using an application through a receiving module configured to receive an electronic content into the application, a saving module configured to save the received electronic content to a memory location, wherein an administrator of the application controls and allocates storage quota, based on a subscription type of one or more users, and a collaborating module configured to collaborate the saved electronic content to one or more recipients using an instant messaging platform in the application based on the subscription type of the one or more users.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE SEVERAL VIEWS OF THE DRAWINGS

The accompanying drawings, which are incorporated in and constitute a part of this disclosure, illustrate exemplary embodiments and, together with the description, serve to explain the disclosed embodiments. The embodiments disclosed herein will be better understood from the following detailed description with reference to the drawings.

It should be appreciated by those skilled in the art that any block diagrams herein represent conceptual views of illustrative systems embodying the principles of the present subject matter.

DETAILED DESCRIPTION OF THE INVENTION

For the purposes of promoting an understanding of the principles of the present embodiments, reference will now be made to the embodiments illustrated in the drawings and specific language will be used to describe the same. It will nevertheless be understood that no limitation of the scope of the embodiments is thereby intended. The embodiments include any alterations and further modifications in the illustrated device and further applications of the principles of the embodiments that would normally occur to one skilled in the art to which the embodiments relates.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As used herein, a "computing device" may be a desktop computer, laptop (or notebook), tablet computer, mobile phone, smart phone, smart device, computer, workstation, handheld computer, ultra mobile personal computer, personal digital assistant (PDA), web pad or any other processing device or equipment.

As used herein "Electronic content" are content or services in electronic forms includes but not limited to reminders, calendars, communication messages such as of e-mail, voice mail, Web mail, Video mail, Instant messaging applications and services, text and file messaging applications and services, Multimedia messaging applications, electronic documents, Textual content, Files in electronic format. For example, the content can include different word processor, spreadsheet, image, e-book, audio, video or music content. The various different formats include, for example, Microsoft Word™ documents (DOC), Apple Pages™ documents (PAGES), Office Open XME Text documents (DOCX), Adobe™ Portable Document Format documents (PDF), Eotus 1-2-3™ documents (123), Microsoft Excel™ documents (XLS), Microsoft Windows Bitmap™ image documents (BMP), CompuServe Graphics Interchange Format™ image documents (GIF), Joint Photographic Experts Group image documents (JPEG), Amazon Kindle™ files (AZW), text files (TXT), Open Electronic Book Package files (OPF), Microsoft Windows Media Audio™ audio files (WMA), Apple Advanced Audio Coding™ audio files (AAC), Microsoft Wave™ audio files (WAV), MPEG Layer 3 files (MP3), MPEG Layer 4 files (MP4), content encoded as DivX™ video files (DivX), Apple Audio Video Interleave™ audio files (AVI), including any variants and/or derivatives of the above formats mentioned file formats include not only text files (*.txt), but also *.xls (Excel files), *.mdb (Access files), *.doc (Word files), *.ppt (PowerPoint files), *.rtf (text files), *.wri (text files), *.pdf (Adobe portable document format files), *.htm (web pages), *.eml (email files), *.url (uniform resource locator), *.asp (active server pages) and general images (*.jpg, *.gif, *.bmp).

The term "application" can refer to a software product or software program that causes a computing device to perform a function. In some examples, an application may also be referred to as "software application," an "app," or a "program". Software applications can perform a variety of different functions for a user. For e.g. a "note taking application" may be any application to accept data to be pasted. Further the note taking application may be a word processing application, an email application, and Short Message Service (SMS), a calendar application, an image editing application, a game application, etc.

Figure 1:
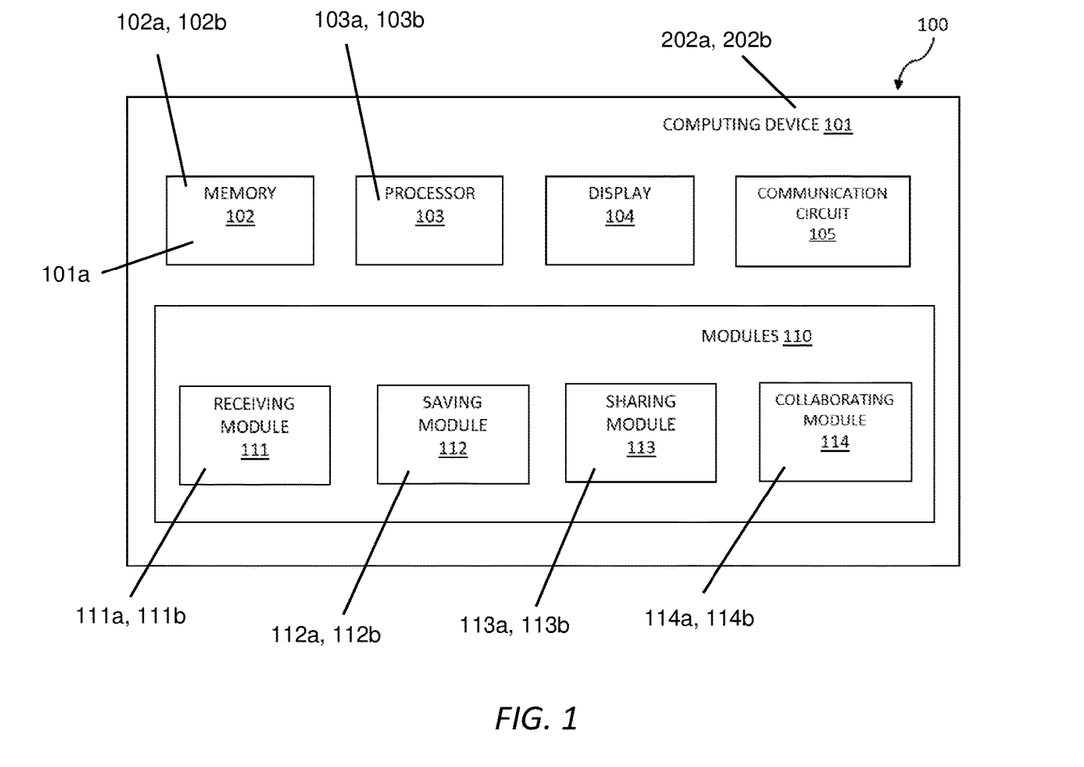
FIG. 1 is a schematic block diagram of the computing device in accordance with some embodiments of the present disclosure.

Referring to FIG. 1, the preferred embodiment 100 of the present disclosure is made up of software and hardware. The computing device 101 (a first computing device 202a by a first user 201a, a second computing device 202b by a second user 201b) for aggregating the content, social sharing and instant messaging comprises one or more components such as Memory 102 (a first memory 102a, a second memory 102b), Processor 103 (a first processor 103a, a second processor 103b), Display 104 and Communication circuit 105.

The memory 102 includes random access memory (RAM) and read only memory (ROM). The memory 102 may store computer-readable, computer-executable instructions that, when executed, causes the processor 103 to perform various functions of the computing device 101. In another aspect, the memory 102 may also comprise Basic Input/Output System (BIOS) which may control basic hardware and/or software operation such as the interaction with the peripheral components or devices.

The processor 103 may be a general-purpose processor, a Digital Signal Processor (DSP), a Central Processing Unit (CPU), a micro-controller, an Application-Specific Integrated Circuit (ASIC), a Field-Programmable Gate Array (FPGA), a Programmable Fogic Device (PFD), a discrete gate or transistor logic component, a discrete hardware component or any combination thereof. In another aspect, the processor 103 may be configured to operate a memory array using a memory controller. In yet another aspect, the processor 103 may configured to execute computer-readable instructions stored in the memory 102 to perform various functions of the computing device 101.

The display 104 may be any display such as Fiquid Crystal Display (FCD), Fight Emitting Diodes (FED), Thin Film Transistors (TFT), Active-Matrix Organic Light-Emitting Diode (AMOLED), etc. which helps the user to read the electronic contents and select, copy and save in one click using the application of the present disclosure.

The communication circuit 105 is used by the user to transmit and receive the electronic content so that the received electronic content can be saved on the memory location directly in one click without leaving the display 104 screen.

The computing device 101 further comprises modules 110. The modules 110 may include for e.g. receiving module 111 (a first receiving module 111a, a second receiving module 111b), saving module 112 (a first saving module 112a, a second saving module 112b), sharing module 113 (a first sharing module 113a, a second sharing module 113b), collaborating module 114 (a first collaborating module 114a, a second collaborating module 114b). The modules 110 may also comprise other modules (not shown) to perform various miscellaneous functionalities of the computing device 101. It will be appreciated that such aforementioned modules may be represented as a single module or a combination of different modules. In the present embodiment, the term of module is a software component performed on the operation system. The function modules of the computing device can be integrated into a processing chip or formed by individual modules, or two or more modules are assembled together. The assembled modules may be hardware or software function blocks. If the assembled modules are implemented by software components for sale and use independently, they are stored in the computer readable storage medium including Read Only Memory (ROM), disk drive and/or optical disk.

As used herein, a "computer readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a Digital Versatile Disc (DVD), etc.), and the like, or a combination thereof. Further, any computer readable storage medium described herein may be non-transitory.

Accordingly, the embodiments provide a computing device 101 for aggregating content and social sharing using an application through a receiving module 111 configured to receive an electronic content into the application, a saving module 112 configured to save the received electronic content to a memory location, wherein an administrator of the application controls and allocates storage quota, based on a subscription type of one or more users, and a sharing module 113 configured to share the saved electronic content to one or more recipients using the application.

Accordingly, the embodiments provide a computing device 101 for aggregating content and collaborating through an instant messaging using an application 101a through a receiving module 111 configured to receive an electronic content into the application, a saving module 112 configured to save the received electronic content to a memory location, wherein an administrator of the application controls and allocates storage quota, based on a subscription type of one or more users, and a collaborating module 114 configured to collaborate the saved electronic content to one or more recipients using an instant messaging platform in the application based on the subscription type of the one or more users.

Figure 2:
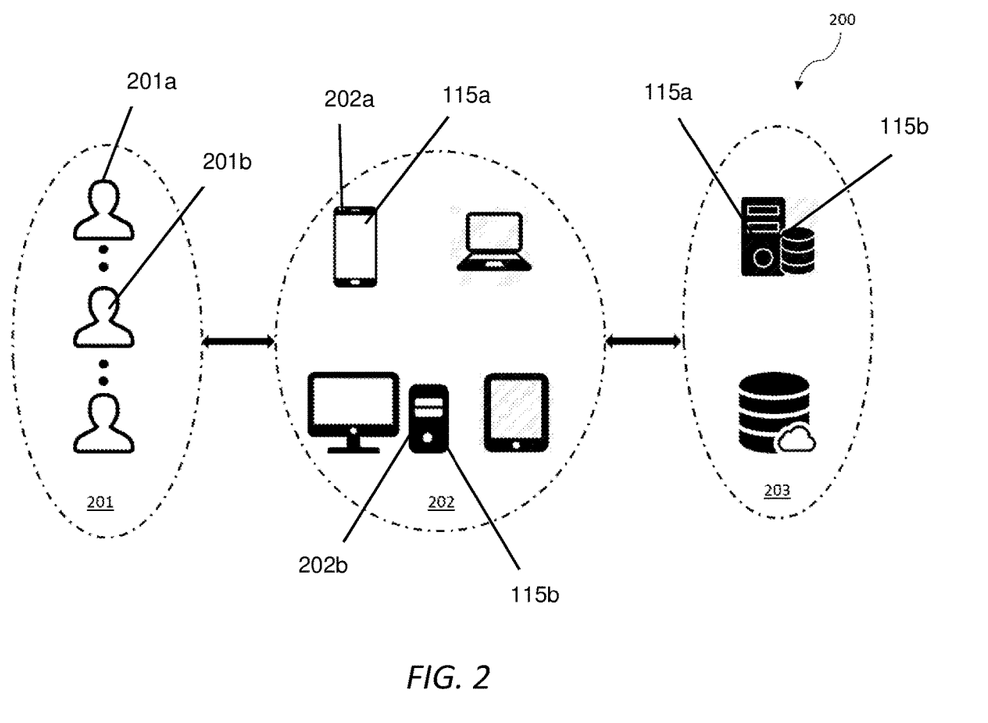
FIG. 2 is a schematic view of a simplified illustration of a user interacting with a computing device to aggregate content, socially share the content and collaborate with other users using the instant message platform in the application in accordance with some embodiments of the present disclosure.

Referring to FIG. 2, the another embodiment 200 of the present disclosure consists of plurality of users 201 using the application for aggregating content, social sharing and instant messaging in a single platform. The user runs the application on the computing device 202 (a first computing device 202a by a first user 201a, a second computing device 202b by a second user 201b) wherein the computing device having a receiving module 111 (a first receiving module 111a, a second receiving module 111b) configured to receive an electronic content into the application, and a saving module 112 (a first saving module 112a, a second saving module 112b) configured to save the received electronic content to a memory location, wherein an administrator of the application controls and allocates storage quota, based on a subscription type of one or more users. The subscription type of the one or more users comprises of Personal, Business and Enterprise users. Based on the subscription type different features, rights and roles are given to the users 201. When the users 201 selects the received content the application triggers to pop-up a user interface, prompting to save in one click, the copied content to the memory location. The one click saving of the electronic content can be performed by the users 201 from any third party application or any electronic content on a computing device screen without leaving the computing device screen, when the users read the electronic content.

The electronic content (a first electronic content 115a, a second electronic content 115b) gets stored at a memory location 203 automatically without manual intervention. The memory location can be, but not limited to, cloud server, local server, user server, Software as a Service (SaaS) server, computing device memory. The memory location storage is based on subscription type of the users 201.

Figure 3A:
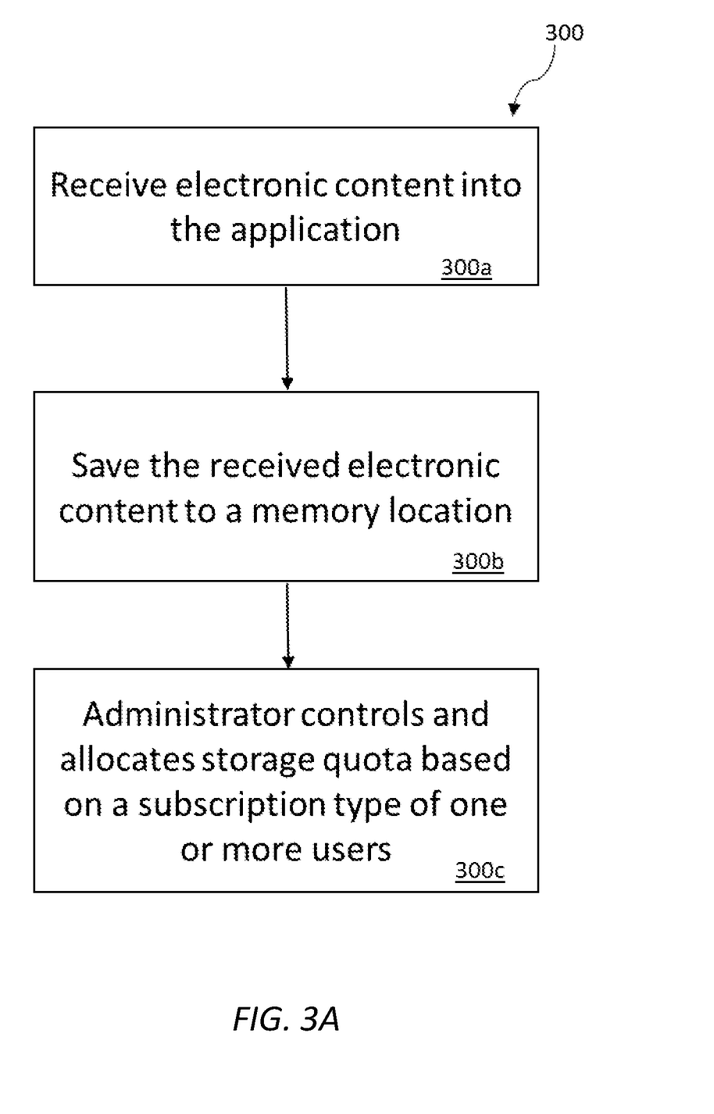
FIG. 3A depicts a flow chart to aggregate content by the user in accordance with some embodiments of the present disclosure.

Referring to FIG. 3A, shows another embodiment of the present disclosure. The flowchart 300 shows a method to aggregating content using an application in a computing device. The steps comprises receiving an electronic content into the application 300a and saving the received electronic content to a memory location 300b, wherein an administrator of the application controls and allocates storage quota, based on a subscription type of one or more users 300c.

Figure 3B:
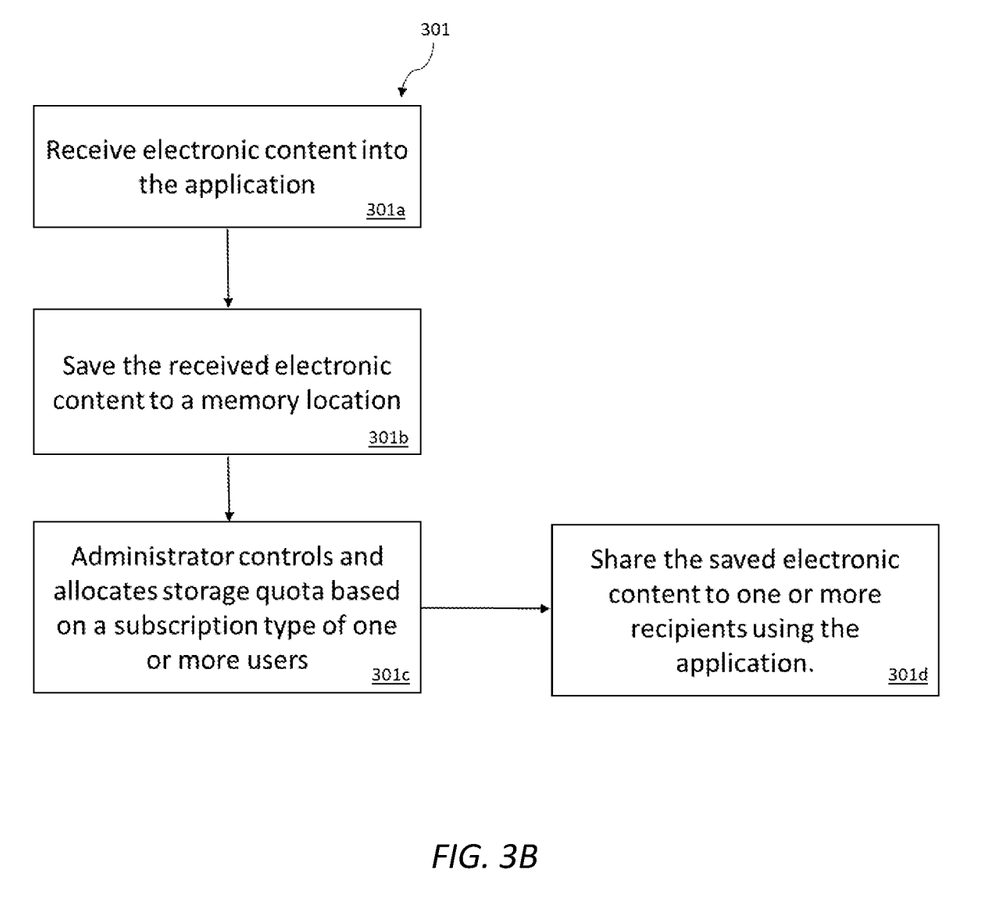
FIG. 3B depicts a flowchart for social sharing of aggregated content by the user in accordance with some embodiments of the present disclosure.

Referring to FIG. 3B, shows another embodiment of the present disclosure. The flowchart 301 shows a method of aggregating content and social sharing using an application in a computing device. The steps comprises of receiving an electronic content into the application at 301a saving the received electronic content to a memory location at 301b, wherein an administrator of the application controls and allocates storage quota, based on a subscription type of one or more users at 301c and sharing the saved electronic content to one or more recipients using the application at 301d.

Figure 3C:
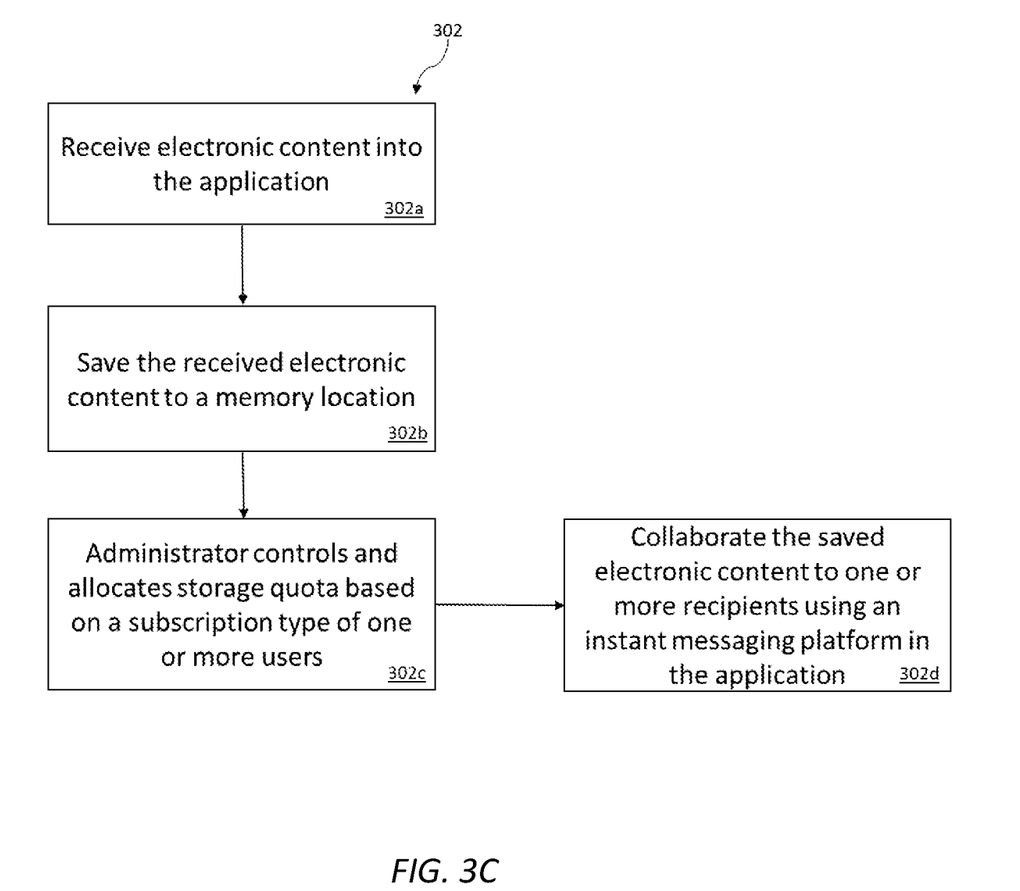
FIG. 3C depicts a flowchart for collaborating by the user using the instant messaging platform in the application in accordance with some embodiments of the present disclosure.

Referring to FIG. 3C, shows another embodiment of the present disclosure. The flowchart 302 shows a method of aggregating content and collaborating through an instant messaging using an application in a computing device. The steps comprises receiving an electronic content into the application at 302a, saving the received electronic content at 302b, wherein an administrator of the application controls and allocates storage quota, based on a subscription type of one or more users at 302c and collaborating the saved electronic content to one or more recipients using an instant messaging platform in the application based on the subscription type of the one or more users at 302d.

Figure 4:
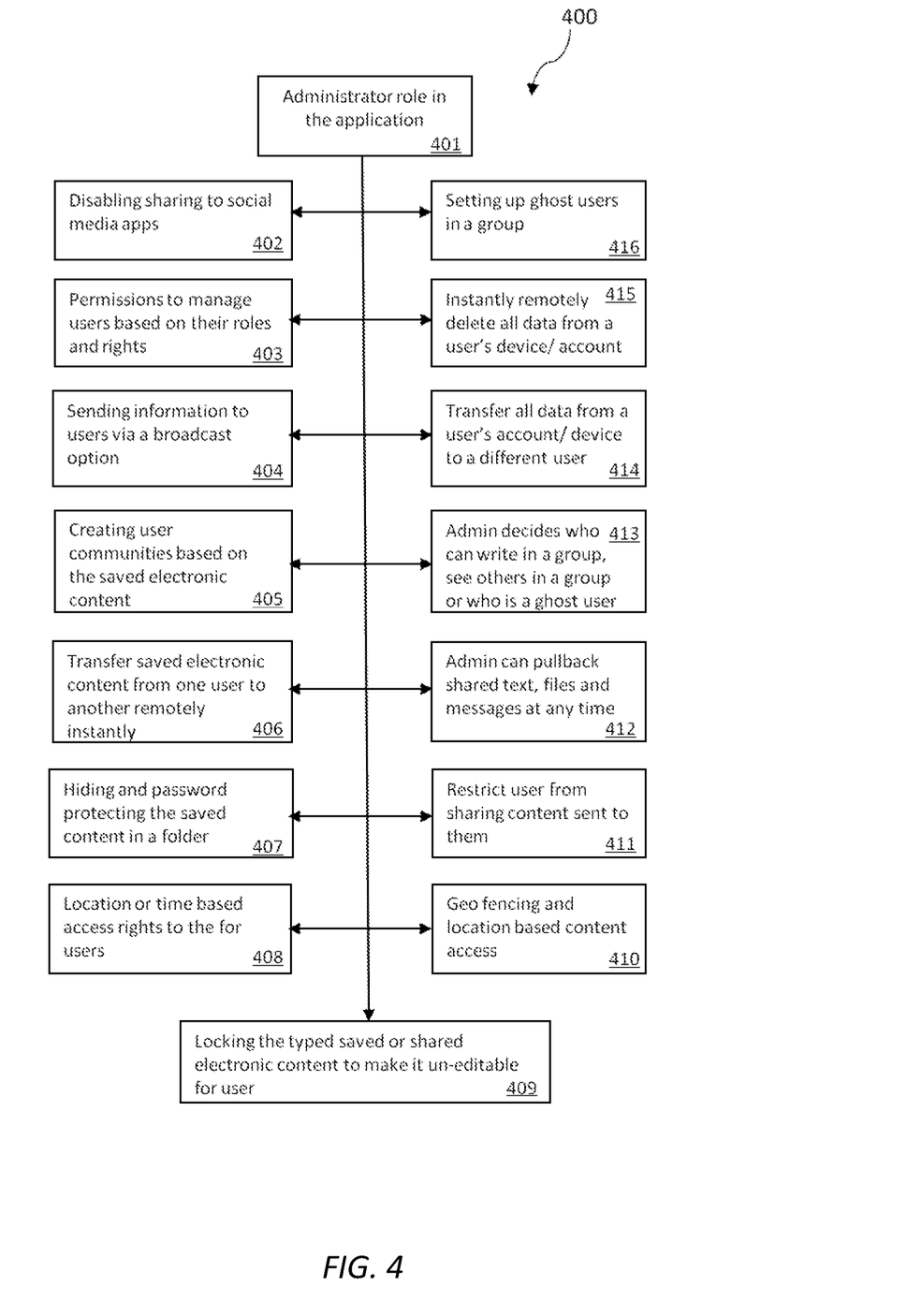
FIG. 4 depicts a schematic view of a diagram of the administrator role and rights to control the user and content in the application in accordance with some embodiments of the present disclosure.

Referring to FIG. 4, shows the role of the administrator 401 in the application of the present disclosure. The administrator controls and decides the rights and roles of the users for the business and enterprise type of subscription. The role of administrator for the application is at least one of:

a. Disabling sharing of typed or saved electronic content directly to a social media application at 402. Disabling sharing of the types or saved electronic content directly to social media application ensures security and prevents leakage of confidential information in the hands of enemies or competitors.

b. Providing plurality of permissions to manage users for restricting access to shared electronic content based on plurality of roles and rights of the one or more users at 403: The administrator can provide various permission to one or more users based on the roles and rights. The administrator for e.g. can permit certain users with higher roles in the business to share content with other users of the same role.

c. Sending information via a broadcast option to the one or more users at 404: The administrator instead of sharing the electronic content individually has an option to broadcast the electronic content to more than one user through the application platform or through third party application.

d. Creating communities based on the saved electronic content and building a customized plurality of communities for the one or more users at 405: The administrator can create communities based on saved content to build a customized list of communities where electronic contents of common interest can be shared within the community.

e. Transferring the saved electronic content instantly from a first user to a remote second user at 406: The administrator can send instantly electronic data from one user to another user who is remotely located. This is very useful in case application when an employee leaves the organization and their contents needs to be shared to a new employee.

f. Hiding and password protecting the saved electronic content in a folder at 407: The administrator can hide a folder to maintain security or can password protect it using 4 digit pin or through biometrics or fingerprint recognition.

g. Restricting access to the saved or shared electronic content based on location or time based access rights to the one or more users at 408: The administration can create a geo fencing sort of access right where users/employees from a particular location would only be able to access to the saved electronic contents whereas other users/employees outside the location would be denied access to the saved electronic content. Similarly, the administrator of the application can restrict access based on certain allocated time to certain users/employees. After the expiry of the set time, the saved content may be self destructed or the access to the saved electronic content would be denied.

h. Mapping the geographical location to track the movement and location of the one or more users at 410: The administrator can track the movement or location of the users using the map and GPS function in the application. This is very useful in case the administrator want to keep track on the current and last known location of employees to track them to see whether they are performing the assigned task at certain geographical location. Similarly, this feature is useful in case of tracking children and elderly people who are using similar application on their computing device.

i. Locking the typed, saved or shared electronic content to make it un-editable for the one or more recipients or the one or more users at 409: The administrator can lock the typed, saved or shared electronic content to make it un-editable for the users. This feature is very useful when the administrator wants certain saved electronic content to be locked specifically legal contents where the contents have to be locked for most of the electronic content.

j. Setting up ghost users in a group based on the subscription type of the one or more users at 416: The administrator can set up ghost users to keep a watch on other users in the community so that they can keep a track on the users activity. k. Deleting remotely the saved and shared electronic content from the computing device or an account of the one or more users at 415: The administrator can use this feature to remotely delete saved and shared electronic content from computing device of the users. This is especially useful if the computing device falls into enemy or competitor hands, the computing device is lost or an employee leaves the organisation.

l. Transferring the saved and shared electronic content from the computing device or from an account of a first user to a second user at 414: Administrators can transfer the saved and shared electronic content from the computing device or from an account of a first user to a second user. This saves time when the electronic content is required to be transferred to multiple users.

m. Deciding rights of a group to perform at least one of writing in the group, observing the one or more users in the group and determining ghost users of the group at 413: The administrator can decide the rights of a group so that the users of the group can write in the group based on permission given by administrator. Right to observe multiple users in a group and determining who would be ghost users in the group.

n. Withdrawing the shared and saved electronic content at any time for the one or more users at 412: The administrator can use this feature and withdraw/pullback the shared and saved electronic content access to a user if he feels that the user no longer requires the content, or the access was given wrongly by the administrator to the user.

o. Restricting the one of more recipients from sharing electronic content received to them at 411: Administrator can use this feature to restrict certain users who have received the electronic content and prevent them from sharing the content so that the content remains secure.

Some of the features available to administrator are also available to the users for eg. withdraw/pullback the shared and saved electronic content access, locking the typed, saved or shared electronic content to make it un-editable, location or time based access rights, hiding and password protecting the saved electronic content, restricting other users from sharing the contents sent to them, geofencing and location based access rights.

Apart from the above roles of the administrator, the administrator can bulk upload users rather than individual account registration for business and enterprise subscription type users. This prevents manual entry of individual users and saves time. Also, the administrator can decide the limit of content size and can control the storage space allotted to each user based on the subscription plan and the requirements and rights of the user.

Figure 5:
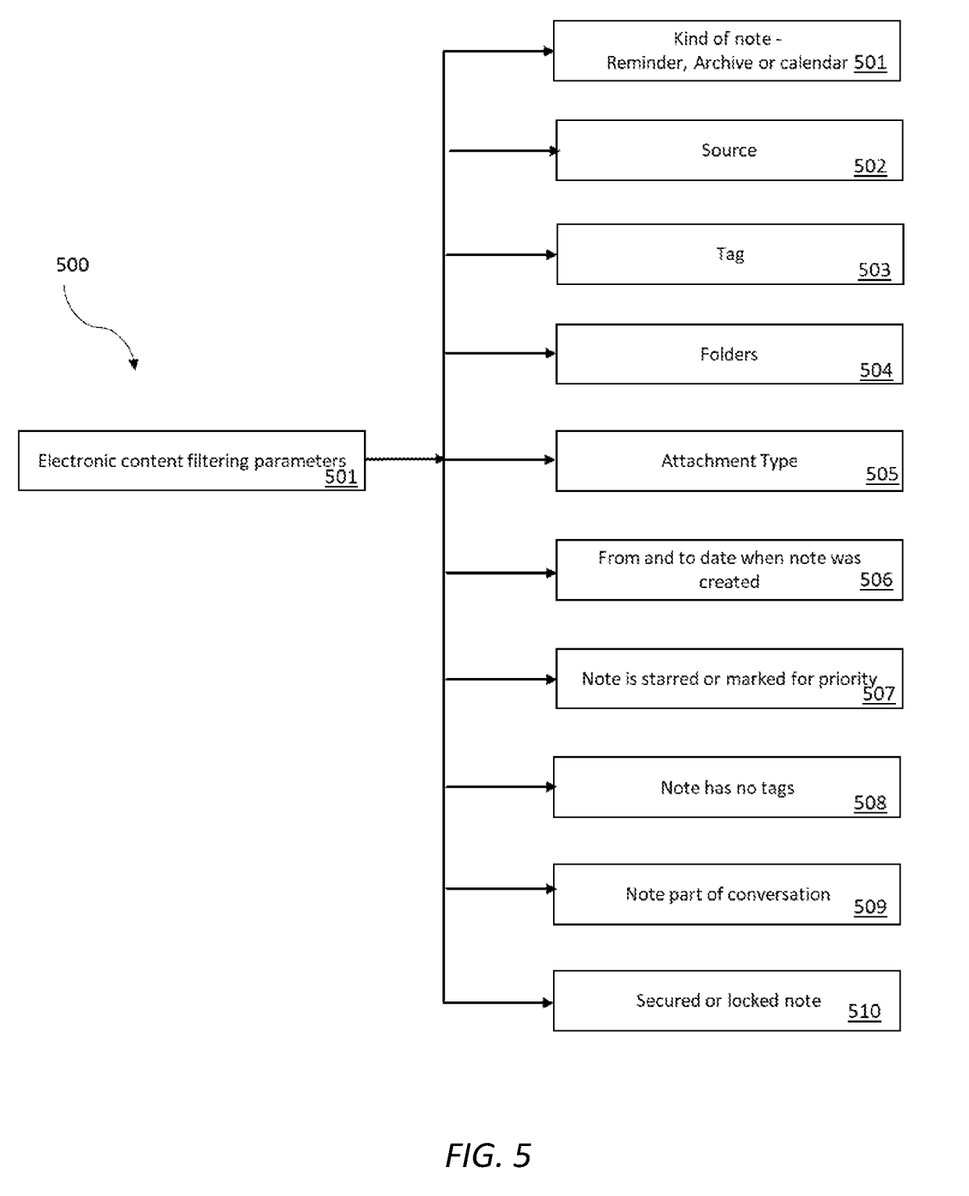
FIG. 5 is a schematic view of an illustration depicting the filtering parameters to filter the saved electronic content in accordance with some embodiments of the present disclosure.

Referring to FIG. 5, another embodiment of the present disclosure 500 shows the filtering and searching option in the application 501. As a non limiting example, application provides 10 parameters for filtering the saved content. The filtering parameters comprises type of the saved electronic content-reminder, archive or calendar at 501, source of the saved electronic content at 502, tagging of the saved electronic content at 503, saved electronic content in plurality of folders at 504, attachment type at 505, start and end date when the saved electronic content was created at 506, saved electronic content is starred or marked for priority at 507, saved electronic content having no tags at 508, saved electronic content as part of communication message at 509 and secured or locked saved electronic content at 510.

Users can filter the saved content using one or more filter parameters at a single time to search for the desired saved electronic content. The search can be performed not only on the textual content saved in the memory, but also on the textual content in the documents.

Other embodiments of the present disclosure comprises features where the electronic content received to the application such as for e.g. an email sent to an id of the application program causes the electronic content to be saved as a new note in the memory location thus, making it easier to save mails. The electronic content can be saved online or offline thus, making it easier for the user to save electronic content without worrying the need of communication network to save electronic contents.

The application has multiple sections and multiple folders separately for business and personal use, where the saved electronic content is stored in a separate section and folder for personal and business use to ensure security and maintain secrecy.

Other embodiment of the present disclosure relates to saved electronic contents:

a. Each time the user edits a saved content, the application creates a new version. This helps the saved electronic content to be tracked and audited for future use.

b. All kinds and formats of electronic content can be tagged including electronic documents for e.g. images or communication messages which can be saved along-with a tags and a text, thus it becomes easy to search and filter the required electronic content as per users needs c. Cross-linking of saved and shared electronic content using tags can help reduce duplicate files as well as save memory. Multiple copies of files need not be saved in folders.

d. Communication messages such as chats can be organized and saved in one or more folders. The shared and saved electronic content can be organized into personal space, enterprise space and public space so that the files can be protected e. Saved filed can be protected using 6 digit pin or through other security techniques like biometrics, fingerprint identification etc.

f. The saved electronic content can be created, searched and filtered by using voice based functions. This reduces manual efforts and the contents can be saved quickly and effortlessly g. All the saved electronic contents can be merged by the user and can be converted into other file formats according to the needs of the user.

h. All the saved scheduled reminders calendar events can be consolidated to benefit to the user to view them at one go. The user can also schedule calendar events directly to the account or device of another user.

The collaborating feature of the application deals with collaborating between users by using the instant message platform in the application. The users can create customized template for a chat message or any electronic content and can use them during chat conversation for quick chatting with other users. The user also has the option to use the saved electronic content which can be shared as a conversational message using the instant messaging platform from the application itself without the need for copy-pasting the electronic content.

Other embodiments include users where they can collaborate and work on their computing devices such as a smart phone similar to a white board on a computer, both content and chat can be edited and modified in a collaborative manner. Thus, the application provides a single platform to save, share and collaborate work using the application of the present disclosure.

According to another embodiment, a computer program product may be embodied on a non-transitory computer readable medium. The computer program product may be configured to control a processor to perform a method of aggregating content using an application in a computing device by receiving an electronic content into the application and saving the received electronic content to a memory location, wherein an administrator of the application controls and allocates storage quota, based on a subscription type of one or more users.

According to another embodiment, a computer program product may be embodied on a non-transitory computer readable medium. The computer program product may be configured to control a processor to perform a method of aggregating content and social sharing using an application in a computing device by receiving an electronic content into the application, saving the received electronic content to a memory location, wherein an administrator of the application controls and allocates storage quota, based on a subscription type of one or more users and sharing the saved electronic content to one or more recipients using the application.

According to another embodiment, a computer program product may be embodied on a non-transitory computer readable medium. The computer program product may be configured to control a processor to perform a method of aggregating content and collaborating through an instant messaging using an application in a computing device by receiving an electronic content into the application, saving the received electronic content, wherein an administrator of the application controls and allocates storage quota, based on a subscription type of one or more users and collaborating the saved electronic content to one or more recipients using an instant messaging platform in the application based on the subscription type of the one or more users.

The application program helps to increase the processing speed of the computing device and improves the utilization of the computing device by preventing using of multiple apps for collaboration or electronic content aggregation. Other advantages include saving time and space (memory) since the user does not need not leave the display screen of the computing device and can save, share and collaborate the electronic content using a single application platform with just 1 click select, copy and save option. Network congestion is also minimized since the application can run offline. The application program helps the user organise the electronic content in an organised manner making it easy to search and find and thus utilizing low processing power of computing device.

While these embodiments have been described with respect to at least one embodiment, the present embodiments can be further modified within the spirit and scope of this disclosure. This application is therefore intended to cover any variations, uses, or adaptations of the embodiments using its general principles. Further, this application is intended to cover such departures from the present disclosure as come within known or customary practice in the art to which this embodiment pertains and which fall within the limits of the appended claims.

I claim:

1. A method of aggregating content, the method comprising the steps of:
  installing an application on a first computing device by a first user, said first computing device being comprised of a first memory, first processor, a first receiving module, a first saving module, a first sharing module, a first collaborating module, and a first electronic content stored in said first computing device;
  installing said application on a second computing device by a second user, said second computing device being comprised of a second memory, a second processor, a second receiving module, a second saving module, a second sharing module, a second collaborating module, and a second electronic content stored in said second computing device;
  receiving said first electronic content into a memory location of said application from said first user;
  receiving said second electronic content into said memory location of said application from said second user;
  saving said first electronic content in said memory location according to a first administered subscription of said first user;
  saving said second electronic content in said memory location according to a second administered subscription of said second user;
  sharing said first electronic content with said second user through said application on said second computing device only according to said first administered subscription and said second administered subscription;
  a. Disabling sharing of said first electronic content directly to a social media application;
  b. Hiding and password protecting said first electronic content in a folder within said memory location;
  c. Restricting access to said first electronic content based on location or time based access rights to the users;
  d. Locking said first electronic content so as to be un-editable for at least one user;
  e. Setting up ghost users in a group based on said first administered subscription type;
  f. Deleting remotely said first electronic content from at least one user;
  g. Deciding rights of a group to perform at least one of writing in the group, observing the group, and determining ghost users of the group;
  h. Withdrawing said first electronic content from at least one user at any time; and
  i. Restricting said first user from sharing from said memory location.

2. The method of claim 1, further comprising the step of: modifying said first electronic content by said second user so as to form collaborated electronic content stored in said memory location.

3. The method of claim 1, wherein the step of sharing said first electronic content with said second user further comprises the steps of: presenting said first electronic content to said second user on said second computing device with an option to save said first electronic content; and saving said first electronic content in said memory location according to said second administered subscription of said second user.

4. The method of claim 3, wherein said first electronic content is from a third party application.

5. The method of claim 1, wherein said first administered subscription of said first user is comprised of a storage quota.

6. The method of claim 1, wherein said first administered subscription of said first user and said second administered subscription are identical, said first user and said second user being bulk users.

7. The method of claim 1, sections and folders within said memory location.

8. The method of claim 1, wherein said first electronic content comprises at least one of:
  a. a source of said first electronic content;
  b. a time limit to said first electronic content in said memory location;
  c. a link to any collaborated electronic content based on said first electronic content;
  d. a tag of said first electronic content; e. a tag link of said first electronic content;
  f. an organizing communication message into a folder in said memory location, said first electronic content being separated into said folder; and g. a designation of said first electronic content into at least one group consisting of: a personal space, a bulk space, and a public space.

9. The method of claim 1, further comprising the steps of: filtering said first electronic content and said second electronic content in said memory location into parameters; and searching said first electronic content and said second electronic content, according to said parameters.

10. The method of claim 9, wherein the step of searching said first electronic content and said second electronic content, according to said parameters is voice activated.

11. The method of claim 1, further comprising the steps of: notifying said first user of said second electronic content in real time.

12. The method of claim 1, wherein the first administered subscription is comprised of a customized template for saving said first electronic content or for the instant messaging a conversational message.

13. The method of claim 12, wherein said instant messaging is to said second user through said application.

14. The method of claim 1, wherein said first electronic content is from a third-party application.

15. The method of claim 14, wherein said third party application is a social media platform.

16. The method of claim 1, wherein said application is stored in said first memory and said second memory.

17. The method of claim 1, wherein said first electronic content is stored in said first memory.

* * * * *